United States Patent Office

3,743,636
Patented July 3, 1973

3,743,636
TRIALKYLSILYLOXIMO STEROIDS
Werner Hartmann, Kurt Barnikol-Oettler, and Gerhard Teichmüller, Jena, Germany, assignors to Veb Jenapharm, Jena, Germany
No Drawing. Continuation-in-part of application Ser. No. 885,616, Dec. 16, 1969. This application Dec. 8, 1971, Ser. No. 206,153
Int. Cl. C07c *173/00*
U.S. Cl. 260—239.55 R          27 Claims

ABSTRACT OF THE DISCLOSURE

An androstane, pregnane or estrane steroid compound having one or more trialkylsilyl-ketoxime groups attached to one of the rings and/or as part of a side chain. The compound may be in optically active form or a racemate. Its molecule may be saturated or unsaturated and may contain free, esterified or etherified hydroxyl groups, ketal groups or other substituents such as halogen, alkene or alkine groups.

The compounds of the invention have pharmacological properties making them particularly suitable for use as fertility control agents.

CROSS-REFERENCE TO RELATED APPLICATIONS

This application is a continuation-in-part of application Ser. No. 885,616 filed on Dec. 16, 1969 by the same inventors in respect of "Steroid Compounds," now abandoned.

BACKGROUND OF THE INVENTION

This invention relates to steroid compounds and more particularly to steroid compounds whose ketoxime groups are substituted by trialkylsilyl groups and to a process of preparing such compounds.

In the literature on gas chromatography of natural steroid mixtures, it has been mentioned that oximes, subjected to the conditions used for silylating tertiary hydroxyl groups, are converted into trimethylsilyloxime compounds. These compounds are described as being possessed of good gas-chromatographic properties and are very sensitive to hydrolysis. They have not, however, been described in detail. From the silicone chemistry, a process is known according to which non-steroid ketoximes are reacted with trimethylchlorosilane in pyridine to form polymerizable trimethylsilyloximino compounds which are hydrolysis-stable.

A disadvantage of this latter process is that it is necessary to work with pyridine as a solubility agent, the same being necessary to intercept the HCl formed from the trimethylchlorosilane in the reaction or present as catalyst. From other known reactions of steroids which are carried out in the presence of pyridine as solvent, it is known that the necessary removal of the pyridine from the reaction mixture is very difficult and time-consuming, involving washing with acid and subsequent neutralization of the reaction mixture. In the case of the preparation of trialkyloximino compounds, however, the washing with acids is not permissible as thereby, particularly with the amounts of acid required, the hydrolysis to the oximes is brought about. It is therefore unavoidable that in the processing of the reaction mixtures, some pyridine remains in the substrate so that its total removal must be carried out through recrystallization procedures.

The silylation of hydroxysteroids is carried out according to a known method by melting trimethylsilylacetamide and the steroidoxime to produce the desired compound. This reaction however, in view of the technical difficulties of carrying it out, and also due to the formation in the reaction of acetamide, which is only with difficulty separable from the reaction product, has not proved suitable for the preparation of pure trialkylsilyloximino steroids.

It is therefore an object of this invention to provide a novel class of steroid compounds, the ketoxime groups of which are substituted by trialkylsilyl groups and which are eminently suitable for use as medicinal agents.

The steroid compounds of the invention whose ketoxime groups are substituted by trialkylsilyl groups are obtained on a technical scale, in highly pure form without the necessity of using pyridine as a solvent so that the disadvantages above set out are avoided.

The invention applies to steroids having one or more oxime groups in their ring system and/or in their side chains, which can be present in the optically active form or as the racemate, the molecule of which can be saturated or unsaturated and which can contain free, esterified or esterified hydroxyl groups, ketal groups or other substituents such as halogen, alkene or alkine groups. The steroids are reacted with hexaalkyldisilazane, for example with hexamethyldisilazane, in a water-miscible, dipolar aprotic solvent, for example dimethylsulfoxide, dimethylformamide, or dimethylacetamide, to form the corresponding trialkylsilyloximino steroids.

As starting steroid reactants, there may be used the steroid derivatives with at least one oximino group of estrane, androstane and pregnane, as well as their 19-nor-compounds, such as estrone, 16-hydroxyestrone, 16-ketoestradiol, androsterone, testosterone, 4-chlorotestosterone, 19-nor-testoterone, 19-nor-androstenedione, nor-ethisterone, ethisterone and their esters+ethers and progesterone, 17α-hydroxyprogesterone, 19-norprogesterone, chloromadinone, prednisone, hydroxy-cortisone and the like.

The silylation reaction proceeds relatively rapidly and quantitatively at room temperature. The reaction can however be accelerated by heating the reaction mixture in a water bath. An increase in the reaction velocity is also possible by including in the reaction mixture trimethylchlorosilane. The trimethylchlorosilane, however, must be used in an amount whereby the HCl split off is bound by the ammonia evolved from the hexamethyldisilazane in the reaction. This latter reaction is particularly suitable when tertiary hydroxyl groups are to be silylated. All of the trialkylsilyloxime steroids prepared in accordance with the invention are rapidly hydrolyzed in the presence of even small amounts of acid under reformation of the oxime. In different cases, proton donating solvents such as alcohols, result also in splitting of the molecule. For this reason, it is to be considered most surprising that in spite of the hydrolysis sensitivtiy of the trialkylsilyl-oximino steroid these compounds can be isolated from the reaction mixture in crystalline form by addition of water to the reaction mixture or from the aqueous phase by extracting the non-proton donating solvents, as for example n-hexane or benzene.

When the starting steroid ketoximes still contain free hydroxyl groups, these are also silylated. In the case of steroids which contain previously acylated hydroxyl groups or ether groups, the same are preserved, the same being true also of halogen substituted, double and triple bond compounds. Ketals are not attacked, whereby the possibility is provided to partially ketalize compounds containing a plurality of keto groups and to then convert the still-free keto groups into oximes and oximesilyl-ethers.

The process described makes possible the preparation of trialkylsilyloximino steroids on a technical scale with a decreased expenditure for the process and with readily available starting materials. The disadvantages of the known processes are completely avoided.

The trialkylsilyloximino steroids of the invention have valuable pharmacological properties. They are useful particularly as agents in various methods of fertility control.

For instance, the following two compounds: 17-trimethylsilyloximino - 3,16α - bis-trimethylsilyloxyestra-1,3,5(10)-triene and 3-methoxy-16,17-bis-trimethylsilyloximinoestra-1,3,5(10)-triene had a remarkable long-duration effect in ovluation-blocking tests. This slow release effect is based on their excellent lipoid solubility, which is obtained by the silylation of the highly polar base structure. The compounds, for instance in case of a one-time oral application in amounts of 500γ/kg. to rats, have shown a slow-release ovulation blocking of a duration of between 5 and 8 days. On the basis of this excellent slow-release effect, together with the low estrogenic activity, the compounds are particularly suited for use in ovulation-blocking compositions of long-lasting effect. This permits them to be used in so-called "once a week pills," by which the customary errors in administration as occurring continuously with conventional ovulation-blocking agents are substantially reduced.

17α-ethinyl-17β-acetoxy - 3 - trimethylsilyloximino-4-estrene (norethisterone acetatoximsilylether) shows a progestational activity in the Clauberg test as distinguished from norethisteroneacetate. It has for instance an excellent anti-gonadotropic effect. In a nidation-blocking test carried out with various animal species, the compound had a 100% blocking effect upon a single administration after copulation. Compared with the conventional norethisteroneacetatoxime and its oxime esters or oxim-alkylethers, only 50% of the trimethylsilyl ether or less are necessary to effect the 100% blocking action.

On the basis of these remarkable pharmacological properties, the compound is particularly suited for use as nidation blocking agent within a general program of fertility control. It can also be used as the effective agent in so-called "morning-after pills."

The following examples will further illustrate the invention.

EXAMPLE 1

D 3-methoxy-17-trimethylsilyloximino-$\Delta^{1,3,5(10)}$-estratriene 1 g. D 3-methoxy-17-oximino-$\Delta^{1,3,5(10)}$-estradiene was dissolved in 10 ml. dimethylacetamide and then reacted with 3 ml. hexamethyldisilazane. The reaction mixture was allowed to stand for one day at room temperature. Water was then added and the crystals which separated out were removed by suction, washed with water and air-dried.

M.P.: 72–76° C., recrystallization out of n-hexane (980 mg.), M.P.: 75–78° C., [α]$_D$: +54°, (c.=1, hexane).

EXAMPLE 2

L 3-methoxy-17-trimethylsilyloximino-$\Delta^{1,3,5(10)}$-estratriene 1 g. L 3-methoxy-17-oximino-$\Delta^{1,3,5(10)}$-estratriene in 15 ml. dimethylsulfoxide was reacted with 3 ml. hexamethyldisilazane and the reaction mixture allowed to stand for one day at room temperature. The reaction mixture was further processed as set out in Example 1, and yielded 960 mg. trimethylsilyloximino compound.

M.P.: 74–77° C., recrystallization out of n-hexane, M.P.: 75–78° C., [α]$_D$: −56°, (c.=1, hexane).

EXAMPLE 3

17β-acetoxy-7-trimethylsilyloximino-$\Delta^{3,5}$-androstadiene 200 mg. 17β-acetoxy-7-oximino-$\Delta^{3,5}$-androstadiene were dissolved in 2 ml. dimethylformamide, reacted with 0.6 ml. hexamethyldisilazane and the reaction mixture allowed to stand overnight at room temperature. The substance which crystallized out on addition of water was washed with water and recrystallized out of hexane. Yield: 135 mg.

M.P.: 110–113° C., [α]$_D$: −292° (c.=1, hexane), λ$_{max.}$: 277, ε=16000.

Analogously to Example 3, and using the corresponding oximino steroids, the following compounds were obtained:

3-trimethylsilyloxy-17-trimethylsilyloximino-$\Delta^{1,3,5(10)}$-estratriene [M.P.: 73–75° C.]

17β-trimethylsilyloxy-3-trimethylsilyloximino-$\Delta^4$-estrene [M.P.: 80–90° C. (isomeric mixture)]

3,6-di-trimethylsilyloximino-pregnane-20-ethylene-ketal [M.P.: 112–115° C.]

17β-acetoxy-4-chloro-3-trimethylsilyloximino-$\Delta^4$-androstene [M.P.: 119–126° C. (isomeric mixture)]

17β-propionoxy-3-trimethylsilyloximino-$\Delta^4$-androstene [M.P.: 130–133° C. (isomeric mixture)]

3,20-di-trimethylsilyloximino-$\Delta^4$-pregnene [M.P.: between 90 and 130° C. (isomeric mixture)]

3α,6α-diacetoxy-17-hydroxy-20-trimethyl-silyloximino-pregnane [M.P.: 155–160° C.]

EXAMPLE 4

3α,6α-diacetoxy-20-trimethylsilyloximino-pregnane 1 g. 3α,6α-diacetoxy-20-oximino-pregnane in 10 ml. dimethylformamide was reacted with 2 ml. hexamethyldisilazane and 0.6 ml. trimethylchlorosilane and the reaction mixture allowed to stand overnight. Following the addition of water to the reaction mixture, 1 g. trimethylsilyloximino compound crystallized out. The compound was recrystallized out of n-hexane.

M.P.: 146–149° C., [α]$_D$: 22°, (c.=1, n-hexane).

Analogously to Example 4, but using the corresponding oximinosteroids, the following compounds were obtained:

3,16α-di-trimethylsilyloxy - 17 - trimethyl-silyloximino-$\Delta^{1,3,5(10)}$-estratriene [M.P.: 140–142° C.]

DL-3-methoxy-16,17 - di-trimethylsilyl-oximino-$\Delta^{1,3,5(10)8}$-estratetraene [M.P.: 128–132° C.]

3-methoxy-16,17-di-trimethylsilyloximino-$\Delta^{1,3,5(10)}$-estratriene [M.P.: 139–143° C.]

3,17-di-trimethylsilyloximino-$\Delta^4$-androstene [M.P.: 128–131° C.]

3α,6α-diacetoxy-20-trimethylsilyloximino-$\Delta^{16}$-pregnene [M.P.: 149–150° C.]

17β-acetoxy-17α-ethinyl-3-trimethylsilyl-oximino-$\Delta^4$-estrene [M.P.: 108–112°C.]

DL-3-methoxy-17-trimethylsilyloximino-$\Delta^{1,3,5(10)8}$-estratetraene [M.P.: 90–95° C.]

3-(2'-tetrahydropyranyloy)-17-trimethyl-silyloximino-$\Delta^{1,3,5(10)}$-estratriene [M.P.: 114–118° C.]

17α-ethinyl-17β-trimethylsilyloxy-3-trimethylsilyloximino-$\Delta^4$-estrene [M.P.: 110–115° C. (isomeric mixture)]

A characteristic of the pharmacological activity of the silylated oximinosteroids is a prolongation of the effect of the basic steroid. This is directly due to the silyloximino group and it is this group therefore which makes these compounds particularly suitable for use in slow release preparations.

The preparations of the invention may therefore be used as long duration pharmaceuticals, the selection of a particular compound being based on the activity of the steroid moiety.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims.

We claim:
1. The trimethylsilyloximino-steroid which has the formula

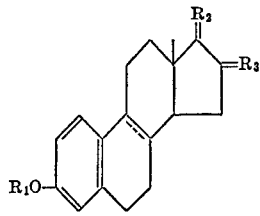

(I)

in which $R_1$ is

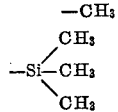

or

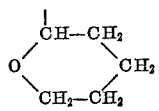

in which $R_2$ is

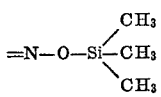

and in which $R_3$ is

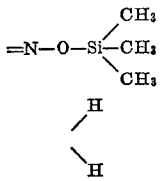

or

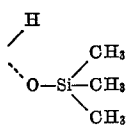

and wherein = indicates a single or double bond.

2. The compound of claim 1, which is designated 3-methoxy - 17 - trimethylsilyloximino-$\Delta^{1,3,5,(10)}$-estratriene.
3. The compound of claim 1, which is L-3-methoxy-17-trimethylsilyloximino-$\Delta^{1,3,5(10)}$-estratriene.
4. The compound of claim 1, which is 3-trimethylsilyloxy-17-trimethylsilyloximino-$\Delta^{1,3,5(10)}$-estratriene.
5. The compound of claim 1, which is 3,16α-di-trimethylsilyloxy-17-trimethylsilyloximino-$\Delta^{1,3,5,(10)}$-estratrene.
6. The compound of claim 1, which is D,L-3-methoxy-16,17-di-trimethylsilyloximino-$\Delta^{1,3,5(10),8}$-estratetraene.
7. The compound of claim 1, which is 3-methoxy-16,17-di-trimethylsilyloximino-$\Delta^{1,3,5(10)}$-estratriene.
8. The compound of claim 1, which is D,L-3-methoxy-17-trimethylsilyloximino-$\Delta^{1,3,5(10)8}$-estratetraene.
9. The compound of claim 1, which is 3-(2'-tetrahydropyranyloxy) - 17 - trimethylsilyloximino-$\Delta^{1,3,5(10)}$-estratriene.
10. The trimethylsilyloximino-steroid which has the formula

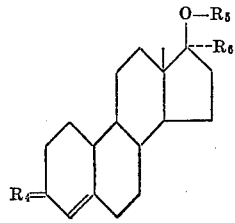

(II)

in which $R_4$ is

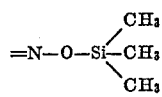

in which $R_5$ is

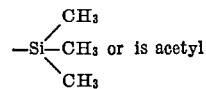

and in which $R_6$ is —C≡CH or —H.

11. The compound of claim 10, which is 17β-trimethylsilyloxy-3-trimethylsilyloximino-$\Delta^4$-estrene.
12. The compound of claim 10, which is 17β-acetoxy-17α-ethinyl-3-trimethylsilyloximino-$\Delta^4$-estrene.
13. The compound of claim 10, which is 17α-ethinyl-17β-trimethylsilyloxy-3-trimethylsilyloximino-$\Delta^4$-estrene.
14. The trimethylsilyloximino-steroid which has the formula

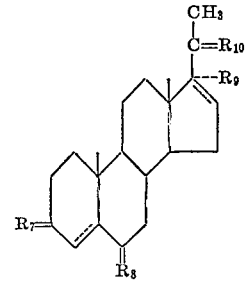

(III)

in which $R_7$ is

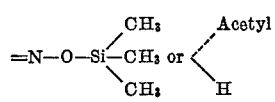

$R_8$ is

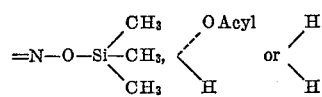

$R_9$ is —OH or —H, with the proviso that no $R_9$ substituent is present in case of a double bond between $C_{16}$ and $C_{17}$, and $R_{10}$ is

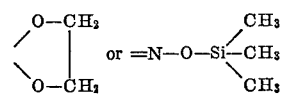

and wherein = indicates a single or double bond between $C_4$ and $C_5$ and between $C_{16}$ and $C_{17}$, and wherein at least one of $R_7$, $R_8$ and $R_{10}$ is a trimethylsilyl-ketoxime group.

15. The compound of claim 14, which is 3,6-di-trimethylsilyloximino-pregnane-20-ethyleneketal.
16. The compound of claim 14, which is 3,20-ditrimethylsilyloximino-$\Delta^4$-pregnene.
17. The compound of claim 14, which is 3α,6α-diacetoxy-17α-hydroxy-20-trimethylsilyloximino-pregnane.
18. The compound of claim 14, which is 3α,6α-diacetoxy-20-trimethylsilyloximino-pregnane.
19. The compound of claim 14, which is 3α,6α-diacetoxy-20-trimethylsilyloximino-$\Delta^{16}$-pregnene.

20. The trimethylsilyloximino-steroid which has the general formula

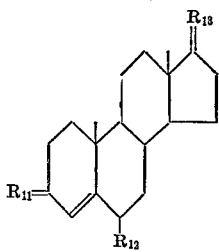

(IV)

in which $R_{11}$ is

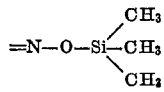

$R_{12}$ is halogen or H, and $R_{13}$ is

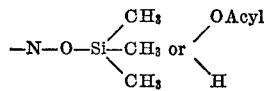

acyl being acetyl or propionyl.

21. The compound of claim 20, which is 17β-acetoxy-4-chloro-3-trimethylsilyloximino-$\Delta^4$-androstene.

22. The compound of claim 20, which is 17β-propionoxy-3-trimethylsilyloximino-$\Delta^4$-androstene.

23. The compound of claim 20, which is 3,17-ditrimethylsilyloximino-$\Delta^4$-androstene.

24. The trimethylsilyloximino-steroid which has the formula

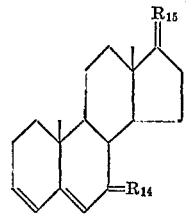

(V)

in which $R_{14}$ is

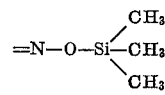

and $R_{15}$ is

25. The compound of claim 24 which is 17β-acetoxy-7-trimethylsilyloximino-$\Delta^{3,5}$-androstadiene.

26. The compound of claim 1 which is an optically active compound.

27. The compound of claim 1 which is a racemate.

References Cited

Luukkainer et al.: Biochim Biophys Acta 52 (1961), pp. 599–601.

Van den Heuvel et al.: Biochim Biophys Acta 144 (1967), pp. 691–694.

HENRY A. FRENCH, Primary Examiner

U.S. Cl. X.R.

260—239.55 C, 397, 397.3, 397.45, 397.5, 999